(12) United States Patent
Moufawad

(10) Patent No.: US 8,720,291 B2
(45) Date of Patent: May 13, 2014

(54) AUTOMATIC MULTI-SPEED GEAR SYSTEM

(76) Inventor: Samir Moufawad, Mazraat Yashouh (LB)

( * ) Notice: Subject to any disclaimer, the term of this patent is extended or adjusted under 35 U.S.C. 154(b) by 428 days.

(21) Appl. No.: 13/038,383

(22) Filed: Mar. 1, 2011

(65) Prior Publication Data
US 2012/0021868 A1    Jan. 26, 2012

Related U.S. Application Data

(60) Provisional application No. 61/344,442, filed on Jul. 23, 2010.

(51) Int. Cl.
*F16H 3/44* (2006.01)

(52) U.S. Cl.
USPC .................. 74/331; 74/335; 74/341; 475/170; 475/172

(58) Field of Classification Search
CPC .............. F16H 3/44; F16H 3/74; F16H 3/76; F16H 35/02
USPC ......... 475/207, 208, 219, 254, 170, 172, 162, 475/169, 255, 256, 257; 74/353, 354, 413, 74/421 R, 840, 384, 331, 341, 745
See application file for complete search history.

(56) References Cited

U.S. PATENT DOCUMENTS

| | | | | |
|---|---|---|---|---|
| 1,404,739 A * | 1/1922 | Broadmeyer | ................... | 74/341 |
| 1,659,426 A * | 2/1928 | Conradson | ..................... | 74/353 |
| 1,943,324 A * | 1/1934 | Kendler | ........................ | 475/172 |
| 1,994,471 A * | 3/1935 | Gregory | ......................... | 475/181 |
| 2,003,825 A * | 6/1935 | Derrah | ........................... | 475/172 |
| 2,131,677 A * | 9/1938 | Sharpe | .......................... | 475/169 |
| 2,304,636 A * | 12/1942 | Gregory | ........................... | 475/47 |
| 2,600,586 A * | 6/1952 | Spencer | ........................ | 475/172 |
| 2,667,089 A * | 1/1954 | Gregory | ........................ | 475/172 |
| 2,972,909 A * | 2/1961 | Miller | ............................ | 475/257 |
| 3,130,606 A * | 4/1964 | Kreis | ............................. | 475/254 |
| 3,273,414 A * | 9/1966 | Boggs | ............................. | 74/353 |
| 4,007,649 A * | 2/1977 | Stirland | ........................ | 475/339 |
| 4,041,835 A * | 8/1977 | Isler | ............................... | 475/254 |
| 4,080,847 A * | 3/1978 | Thomas | ........................ | 475/254 |
| 4,109,551 A * | 8/1978 | Nemec | ............................... | 475/9 |

(Continued)

FOREIGN PATENT DOCUMENTS

| | | |
|---|---|---|
| CH | 95 882 | 8/1922 |
| DE | 15 50 914 | 8/1969 |
| DE | 32 32 122 | 3/1984 |

*Primary Examiner* — Troy Chambers
*Assistant Examiner* — Valentin Craciun
(74) *Attorney, Agent, or Firm* — Cotman IP Law Group, PLC

(57) ABSTRACT

An automatic multi-speed gear system including an input axle, a first arm configured to couple with the input axle allowing for independent rotational movement of the input axle along the input axle axis, a first axle configured to couple with the first arm allowing for independent rotational movement of the first axle along a first axle axis, a second arm configured to couple with the first axle allowing for independent rotational movement of the first axle along the first axle axis, a second axle configured to couple with the second arm allowing for independent rotational movement of the second axle along a second axle axis, and an output axle. The first arm and the second arm are configured to move from a high-speed misalignment position to a low-speed alignment position where the second axle orbits the first axle.

20 Claims, 5 Drawing Sheets

(56) References Cited

U.S. PATENT DOCUMENTS

| | | | | |
|---|---|---|---|---|
| 4,729,261 A | * | 3/1988 | Tervola | 475/94 |
| 4,765,195 A | * | 8/1988 | Takami | 74/113 |
| 4,912,993 A | * | 4/1990 | Konishi et al. | 74/7 E |
| 5,016,493 A | * | 5/1991 | Han | 74/840 |
| 5,116,292 A | * | 5/1992 | Han | 475/16 |
| 5,239,879 A | * | 8/1993 | Economou | 74/69 |
| 5,259,823 A | * | 11/1993 | Coronel | 475/257 |
| 5,685,794 A | * | 11/1997 | Willmot | 475/170 |
| 5,718,652 A | * | 2/1998 | Coronel | 475/169 |
| 5,997,427 A | * | 12/1999 | Fenton | 475/162 |
| 6,537,168 B1 | * | 3/2003 | Han | 475/8 |
| 6,926,636 B2 | * | 8/2005 | Luper | 475/330 |
| 2007/0042857 A1 | * | 2/2007 | Coronel | 475/219 |
| 2007/0049453 A1 | * | 3/2007 | Nagai et al. | 475/254 |
| 2008/0076617 A1 | * | 3/2008 | Lee | 475/162 |
| 2008/0090690 A1 | * | 4/2008 | Lee | 475/207 |
| 2010/0304915 A1 | * | 12/2010 | Lahr | 475/207 |

* cited by examiner

AUTOMATIC MULTI-SPEED GEAR SYSTEM

This application claims the benefit of U.S. Provisional Patent Application No. 61/344,442, filed on Jul. 23, 2010, which is herein incorporated by reference in its entirety.

BACKGROUND OF THE INVENTION

1. Field of the Invention

Embodiments of the invention described herein pertain to the field of gearing. More particularly, but not by way of limitation, one or more embodiments of the invention enable an automatic multi-speed gear system.

2. Description of the Related Art

Multi-speed gear systems are widely used in mechanical systems. Multi-speed gear systems improve the function and usefulness of mechanical systems by giving the system the ability to vary important output parameters. The multi-speed gear system is typically coupled with an input power source, including mechanical power sources, electrical power sources, and mixed power sources. Typically, a high gear ratio decreases speed and increases torque, while a low gear ratio increases speed but decreases torque. In a manual multi-speed gear system, a user must manually switch gears to vary parameters for suitability to operating conditions.

Automatic multi-gear systems are configured to make a gear selection without user input. Ideally, when more torque is required, a low-speed gear should be selected. Automatic multi-gear systems typically involve complex hydraulic systems and/or electronic control systems. For example, a hydraulic automatic transmission typically requires a fluid coupling or torque converter.

To overcome the problems and limitations described above there is a need for a simple automatic multi-speed gear system.

BRIEF SUMMARY OF THE INVENTION

One or more embodiments of the invention enable an automatic multi-speed gear system. Automatic multi-speed functionality is based on a high-speed misalignment position to a low-speed alignment position.

No hydraulics or electronic controls are necessary to control one or more embodiments of the automatic multi-speed gear system. However, one or more embodiments of the automatic multi-speed gear system described herein are compatible with hydraulics and/or electronic control systems. One or more embodiments of the automatic multi-speed gear system can be used in any application for multi-speed gearing, such as bicycles, motorized vehicles, RC vehicles, motorized toys, or any other application compatible with an automatic multi-speed gear system.

One or more embodiments of the automatic multi-speed gear system are directed to multi-speed gear systems including two or more cascaded two-speed gear systems. For example, a three-speed gear system can be configured by cascading two two-speed gear systems, a four-speed gear system can be configured by cascading three two-speed gear systems, a five-speed gear system can be configured by cascading four two-speed gear systems, etc.

One or more embodiments of the automatic multi-speed gear system are directed to multi-speed gear systems including two or more cascaded two-speed gear systems with mechanical control of arm alignment of each two-speed gear system. In one or more embodiments implementing mechanical control of arm alignment for each two-speed gear system, a four-speed gear system can be configured by cascading two two-speed gear systems, an eight-speed gear system can be configured by cascading three two-speed gear systems, a sixteen-speed gear system can be configured by cascading four two-speed gear systems, etc.

One or more embodiments of the automatic multi-speed gear system are directed to an automatic multi-speed gear system including at least one gear system.

The at least one gear system includes an input axle configured to couple with a power source configured to rotate the input axle along an input axle axis. In one or more embodiments, the at least one gear system includes at least one input axle gear coupled with and rotatable with the input axle.

The at least one gear system further includes a first arm configured to couple with the input axle allowing for independent rotational movement of the input axle along the input axle axis. In one or more embodiments, the at least one gear system includes a first axle configured to couple with the first arm allowing for independent rotational movement of the first axle along a first axle axis. In one or more embodiments, the at least one gear system includes at least one first axle gear coupled with and rotatable with the first axle.

The at least one gear system further includes a second arm configured to couple with the first axle allowing for independent rotational movement of the first axle along the first axle axis. In one or more embodiments, the at least one gear system includes a second axle configured to couple with the second arm allowing for independent rotational movement of the second axle along a second axle axis. In one or more embodiments, the at least one gear system includes at least one second axle gear coupled with and rotatable with the second axle.

The at least one gear system further includes at least one output axle gear. In one or more embodiments, the at least one gear system includes an output axle coupled with the at least one output axle gear, where the at least one output axle gear is rotatable with the output axle along an output axle axis. The first arm and the second arm are configured to move from a high-speed misalignment position to a low-speed alignment position when a generated torque level exceeds a transition torque level. The first arm and the second arm are configured to move from the low-speed alignment position to the high-speed misalignment position when the generated torque level drops below the transition torque level. The second axle is configured to orbit the first axle in the low-speed alignment position.

In one or more embodiments, the at least one gear system further includes a one-way bearing. The one-way bearing is configured to allow rotation in a direction that causes movement from the high-speed misalignment position to the low-speed alignment position. In one or more embodiments, the one-way bearing is coupled with at least one of the output axle, at least one of the at least one output axle gear, at least one of the at least one second axle gear, and the second axle.

In one or more embodiments, a momentum of the second axle orbiting the first axle in the low-speed alignment position facilitates movement from the low-speed alignment position to the high-speed misalignment position.

In one or more embodiments, at least one of the at least one input gear is rotationally engageable with at least one of the at least one first axle gear.

In one or more embodiments, at least one of the at least one first axle gear is rotationally engageable with at least one of the at least one second axle gear.

In one or more embodiments, at least one of the at least one second axle gear is rotationally engageable with at least one of the at least one output axle gear.

In one or more embodiments, the at least one gear system includes a first gear system and a second gear system, where the first gear system and the second gear system are cascaded such that a power source of the second gear system includes an output axle of the first gear system.

In one or more embodiments, a first gear system alignment control mechanism configured to control alignment and misalignment of a first gear system first arm and a first gear system second arm, and a second gear system alignment control mechanism configured to control alignment and misalignment of a first gear system first arm and a first gear system second arm.

One or more embodiments of the automatic multi-speed gear system are directed to an automatic multi-speed gear system including at least one gear system.

In one or more embodiments, the at least one gear system includes an input axle configured to couple with a power source configured to rotate the input axle along an input axle axis. The at least one gear system further includes an input axle gear coupled with the input axle, where the input axle gear is rotatable with the input axle.

The at least one gear system further includes a first arm configured to couple with the input axle allowing for independent rotational movement of the input axle along the input axle axis. The at least one gear system further includes a first axle configured to couple with the first arm allowing for independent rotational movement of the first axle along a first axle axis. The at least one gear system further includes a first axle input gear coupled with the first axle, where the first axle input gear is rotatable with the first axle, where the first axle input gear is rotationally engageable with the input axle gear. The at least one gear system further includes a first axle output gear coupled with the first axle, where the first axle output gear is rotatable with the first axle.

The at least one gear system further includes a second arm configured to couple with the first axle allowing for independent rotational movement of the first axle along the first axle axis. The at least one gear system further includes a second axle configured to couple with the second arm allowing for independent rotational movement of the second axle along a second axle axis. The at least one gear system further includes a second axle input gear coupled with the second axle, where the second axle input gear is rotatable with the second axle, where the second axle input gear is rotationally engageable with the first axle output gear. The at least one gear system further includes a second axle output gear coupled with the second axle, where the second axle output gear is rotatable with the second axle.

The at least one gear system further includes an output axle gear rotationally engageable with the second axle output gear. The at least one gear system further includes an output axle coupled with the output axle gear, where the output axle gear is rotatable with the output axle along an output axle axis.

In one or more embodiments, the first arm and the second arm are configured to move between a high-speed misalignment position and a low-speed alignment position, where the second axle is configured to orbit the first axle in the low-speed alignment position.

In one or more embodiments, increasing a load on the output axle causes a transition from the high-speed misalignment position to the low-speed alignment position such that the first axle and the output axle are aligned.

In one or more embodiments, the first arm and the second arm are configured to move from the high-speed misalignment position to the low-speed alignment position when a generated torque level exceeds a transition torque level.

In one or more embodiments, the at least one gear system further includes a one-way bearing configured to allow rotation in a direction that causes movement of the first arm and the second arm from the high-speed misalignment position to the low-speed alignment position. In one or more embodiments, the one-way bearing is coupled with at least one of the output axle, the output axle gear, the second axle output gear, and the second axle.

In one or more embodiments, decreasing a load on the output axle causes a transition from the low-speed alignment position to the high-speed misalignment position.

In one or more embodiments, the first arm and the second arm are configured to move from the low-speed alignment position to the high-speed misalignment position when a generated torque level drops below a transition torque level.

In one or more embodiments, a momentum of the second axle orbiting the first axle in the low-speed alignment position facilitates movement from the low-speed alignment position to the high-speed misalignment position.

In one or more embodiments, the low-speed alignment position, the second axle input gear is configured to orbit the first axle output gear and the second axle output gear is configured to orbit the output axle gear.

In one or more embodiments, the at least one gear system includes a first gear system and a second gear system, where the first gear system and the second gear system are cascaded such that a power source of the second gear system includes an output axle of the first gear system.

One or more embodiments further include a first gear system alignment control mechanism configured to control alignment and misalignment of a first gear system first arm and a first gear system second arm, and a second gear system alignment control mechanism configured to control alignment and misalignment of a first gear system first arm and a first gear system second arm.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

An automatic multi-speed gear system will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
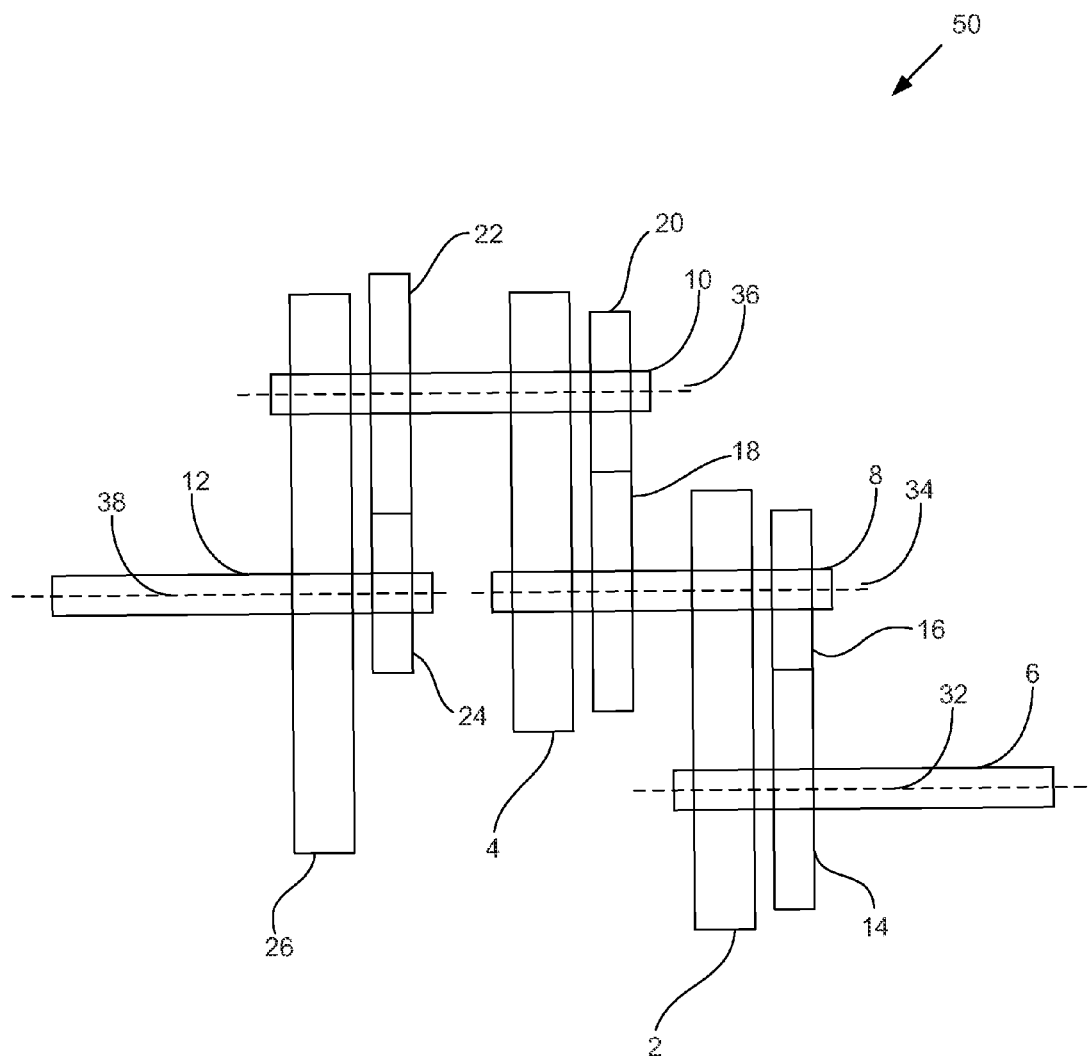
FIG. 1 is a diagram of a side view of an exemplary two-speed gear system in accordance with one or more embodiments of the automatic multi-speed gear system described herein.

FIG. 1 is a diagram of a side view of an exemplary two-speed gear system in accordance with one or more embodiments of the automatic multi-speed gear system described herein.

Two-speed gear system 50 includes input axle 6. Input axle 6 is configured to couple with a power source configured to rotate input axle 6 along input axle axis 32. The power source coupled with input axle 6 may include any manual or automated power source, including power sources powered by an electrical source. In one or more embodiments, the power source coupled with input axle 6 may include one or more turbines, motors, pedals, wheels, or any other mechanism capable of generating and/or accepting energy capable of rotating input axle 6 along input axle axis 32. The power source coupled within input axle 6 may provide a constant or variable rotational energy.

Two-speed gear system 50 further includes first arm 2. First arm 2 is configured to couple with input axle 6, allowing for independent rotational movement of input axle 6 along input axle axis 32. One or more bearings may be used to allow for independent rotational movement of input axle 6 with respect to first arm 2.

Two-speed gear system 50 further includes first axle 8. First axle 8 is configured to couple with first arm 2 allowing for independent rotational movement of first axle 8 along first axle axis 34. One or more bearings may be used to allow for independent rotational movement of first axle 8 with respect to first arm 2.

Two-speed gear system 50 further includes second arm 4. Second arm 4 is configured to couple with first axle 8 allowing for independent rotational movement of first axle 8 along first axle axis 34. One or more bearings may be used to allow for independent rotational movement of first axle 8 with respect to second arm 2.

Two-speed gear system 50 further includes second axle 10. Second axle 10 is configured to couple with second arm 4 allowing for independent rotational movement of second axle 10 along second axle axis 36. One or more bearings may be used to allow for independent rotational movement of second axle 10 with respect to second arm 4.

Two-speed gear system 50 further includes output axle 12. Output axle 12 is configured to rotate along output axle axis 38. In one or more embodiments, output axle 12 is mechanically coupled with one or more components configured to power one or more applications where multi-speed functionality is desirable. For example, output axle 12 may be mechanically coupled with one or more drive wheels, drive shafts, rotary devices, or any other application where multi-speed functionality is desirable.

Two-speed gear system 50 further includes at least one input axle gear coupled with and rotatable with the input axle. For example, the exemplary embodiment of two-speed gear system 50 shown includes input axle gear 14. Input axle gear 14 is configured to rotate with input axle 6.

Two-speed gear system 50 further includes at least one first axle gear coupled with and rotatable with the first axle. In one or more embodiments, at least one input gear is rotationally engageable with at least one first axle gear such that rotational energy of the input axle is transferred to the first axle. As used herein, the term "transfer" refers to a substantial transfer of energy, including mechanical energy, allowing for energy lost through friction, gear mesh losses, and other sources of inefficiency typical of mechanical systems. For example, the exemplary embodiment of two-speed gear system 50 shown includes first axle input gear 16 and first axle output gear 18. Input axle gear 14 is rotationally engageable with first axle input gear 16 such that the rotational energy of input axle 6 is transferred to first axle 8.

Two-speed gear system 50 further includes at least one second axle gear coupled with and rotatable with the second axle. In one or more embodiments, at least one first axle gear is rotationally engageable with at least one second axle gear such that rotational energy of the first axle is transferred to the second axle. For example, the exemplary embodiment of two-speed gear system 50 shown includes second axle input gear 20 and second axle output gear 22. First axle output gear 18 is rotationally engageable with second axle input gear 20 such that the rotational energy of first axle 8 is transferred to second axle 10.

Two-speed gear system 50 further includes at least one output axle gear coupled with and rotatable with the output axle. In one or more embodiments, at least one second axle gear is rotationally engageable with at least one output axle gear such that rotational energy of the second axle is transferred to the output axle. For example, the exemplary embodiment of two-speed gear system 50 shown includes output gear 24. Second axle output gear 22 is rotationally engageable with output gear 24 such that the rotational energy of the second axle 10 is transferred to output axle 12.

In one or more embodiments, input axle gear 14 and first axle input gear 16 are positioned on a first side of first arm 2, and first axle output gear 18 is positioned on a second side of first arm 2. For example, the first side of first arm 2 may be an input-facing side, and the second side of first arm 2 may be an output-facing side.

In one or more embodiments, first axle output gear 18 and second axle input gear 20 are positioned on a first side of second arm 4, and second axle output gear 22 is positioned on a second side of second arm 4. For example, the first side of second arm 4 may be an input-facing side, and the second side of second arm 4 may be an output-facing side.

In one or more embodiments, two-speed gear system 50 further includes one-way bearing 26. One-way bearing 26 may be coupled with at least one of output axle 12, at least one output axle gear such as output axle gear 24, second axle 10 and/or at last one second axle output gear such as second axle output gear 22. One-way bearing 26 is configured to allow rotation in a direction that causes movement of first arm 2 and second arm 4 from a high-speed misalignment position to a low-speed alignment position.

In one or more embodiments, first arm 2 and second arm 4 are configured to move from the high-speed misalignment position to the low-speed alignment position when a generated torque level exceeds a transition torque level. In one or more embodiments, increasing a load on output axle 12 causes a transition from said high-speed misalignment position to said low-speed alignment position such that first axle 8 and output axle 12 are aligned.

In one or more embodiments, first arm 2 and second arm 4 are configured to move from the low-speed alignment position to the high-speed misalignment position when said generated torque level drops below said transition torque level. In one or more embodiments, decreasing a load on output axle 12 causes the transition from the low-speed alignment position to the high-speed misalignment position.

In one or more embodiments, one-way bearing 26 is configured to allow rotation in a direction that causes movement from said high-speed misalignment position to said low-speed alignment position. In one or more embodiments, a momentum of second axle 10 orbiting first axle 8 in the low-speed alignment position facilitates movement from the low-speed alignment position to the high-speed misalignment position.

Figure 2A:
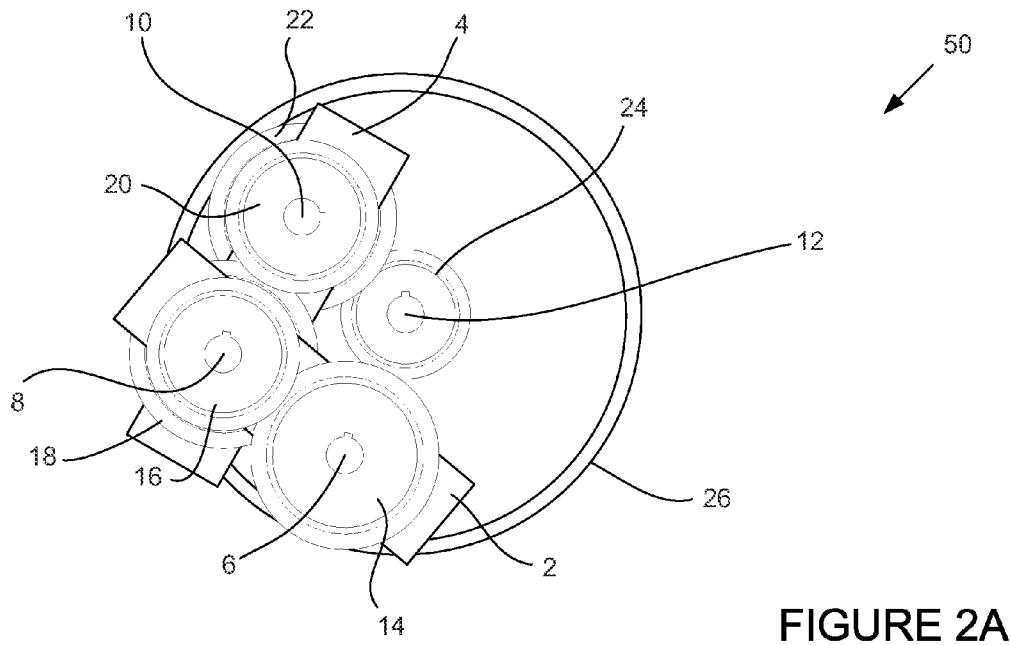
FIG. 2A illustrates an exemplary two-speed gear system in a high-speed misalignment position in accordance with one or more embodiments of the automatic multi-speed gear system described herein.

FIG. 2A illustrates an exemplary two-speed gear system in a high-speed misalignment position in accordance with one or more embodiments of the automatic multi-speed gear system described herein.

Two-speed gear system 50 includes input axle 6. Input axle 6 is configured to couple with a power source configured to rotate input axle 6. The power source coupled with input axle 6 may include any manual or automated power source, including power sources powered by an electrical source. In one or more embodiments, the power source coupled with input axle 6 may include one or more turbines, motors, pedals, wheels, or any other mechanism capable of generating and/or accepting energy capable of rotating input axle 6. The power source coupled within input axle 6 may provide a constant or variable rotational energy. Two-speed gear system 50 further includes input axle gear 14. Input axle gear 14 is coupled with and configured to rotate with input axle 6.

Two-speed gear system 50 further includes first arm 2. First arm 2 is configured to couple with input axle 6, allowing for independent rotational movement of input axle 6. Two-speed gear system 50 further includes first axle 8. First axle 8 is configured to couple with first arm 2 allowing for independent rotational movement of first axle 8.

Two-speed gear system 50 further includes first axle input gear 16. First axle input gear 16 is coupled with and configured to rotate with first axle 8. First axle input gear 16 is rotationally engageable with input axle gear 14 such that the rotational energy of input axle 6 is transferred to first axle 8. Two-speed gear system 50 further includes first axle output gear 18. First axle output gear 18 is coupled with and configured to rotate with first axle 8.

Two-speed gear system 50 further includes second arm 4. Second arm 4 is configured to couple with first axle 8 allowing for independent rotational movement of first axle 8. Two-speed gear system 50 further includes second axle 10. Second axle 10 is configured to couple with second arm 4 allowing for independent rotational movement of second axle 10.

Two-speed gear system 50 further includes a second axle input gear 20. Second axle input gear 20 is coupled with and configured to rotate with second axle 10. Second axle input gear 20 is rotationally engageable with first axle output gear 18 such that the rotational energy of first axle 8 is transferred to second axle 10. Two-speed gear system 50 further includes second axle output gear 22. Second axle output gear 22 is coupled with and configured to rotate with second axle 10.

Two-speed gear system 50 further includes output axle 12. Two-speed gear system 50 further includes output gear 24. Output gear 24 is coupled with and configured to rotate with output axle 12. Second axle output gear 22 is rotationally engageable with output gear 24 such that the rotational energy of the second axle 10 is transferred to output axle 12. In one or more embodiments, output axle 12 is mechanically coupled with one or more components configured to power one or more applications where multi-speed functionality is desirable. For example, output axle 12 may be mechanically coupled with one or more drive wheels, drive shafts, rotary devices, or any other application where multi-speed functionality is desirable.

Figure 2B:
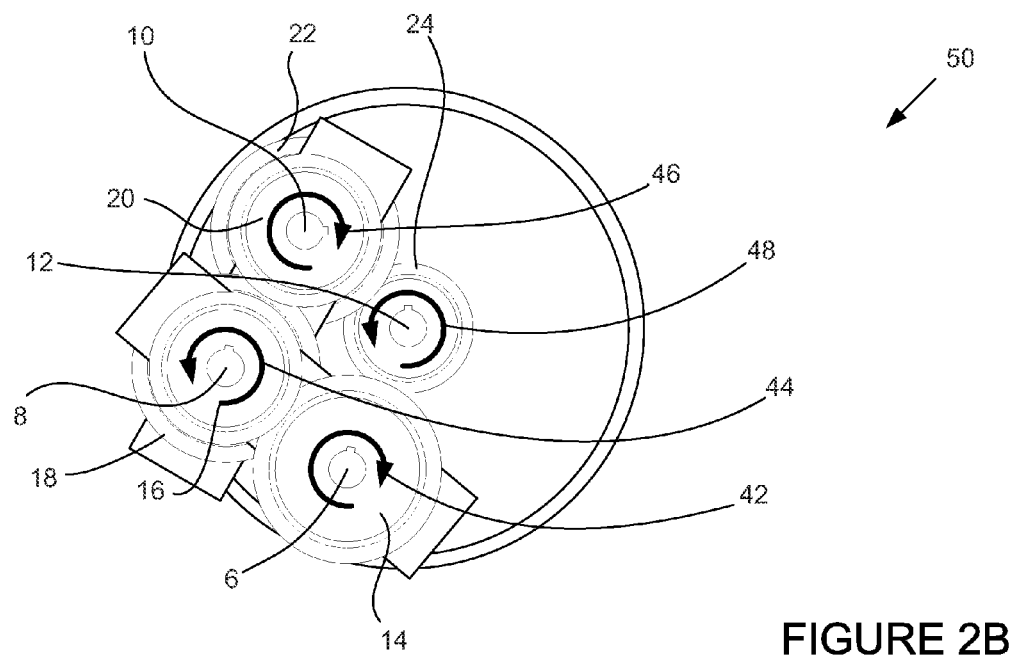
FIG. 2B illustrates motion in an exemplary two-speed gear system in a high-speed misalignment position in accordance with one or more embodiments of the automatic multi-speed gear system described herein.
Figure 3:
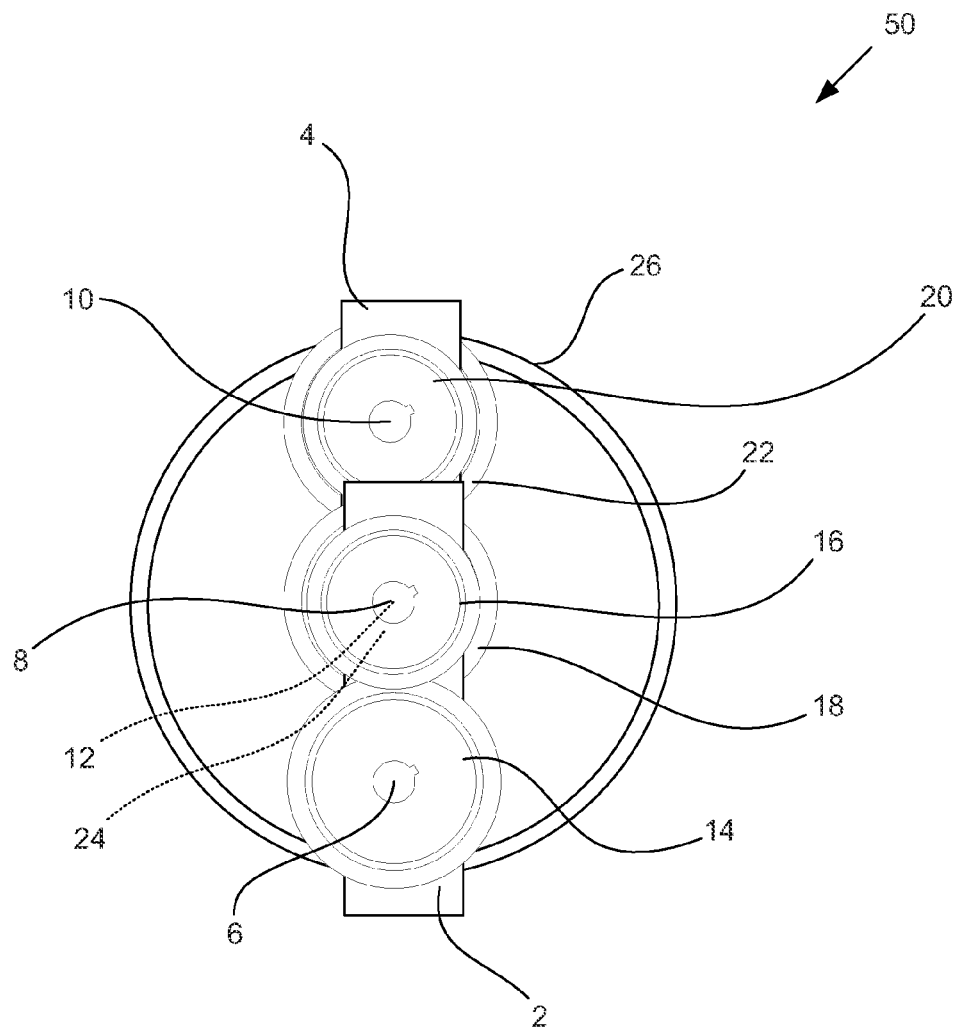
FIG. 3 illustrates an exemplary two-speed gear system in a low-speed alignment position in accordance with one or more embodiments of the automatic multi-speed gear system described herein.
Figure 4:
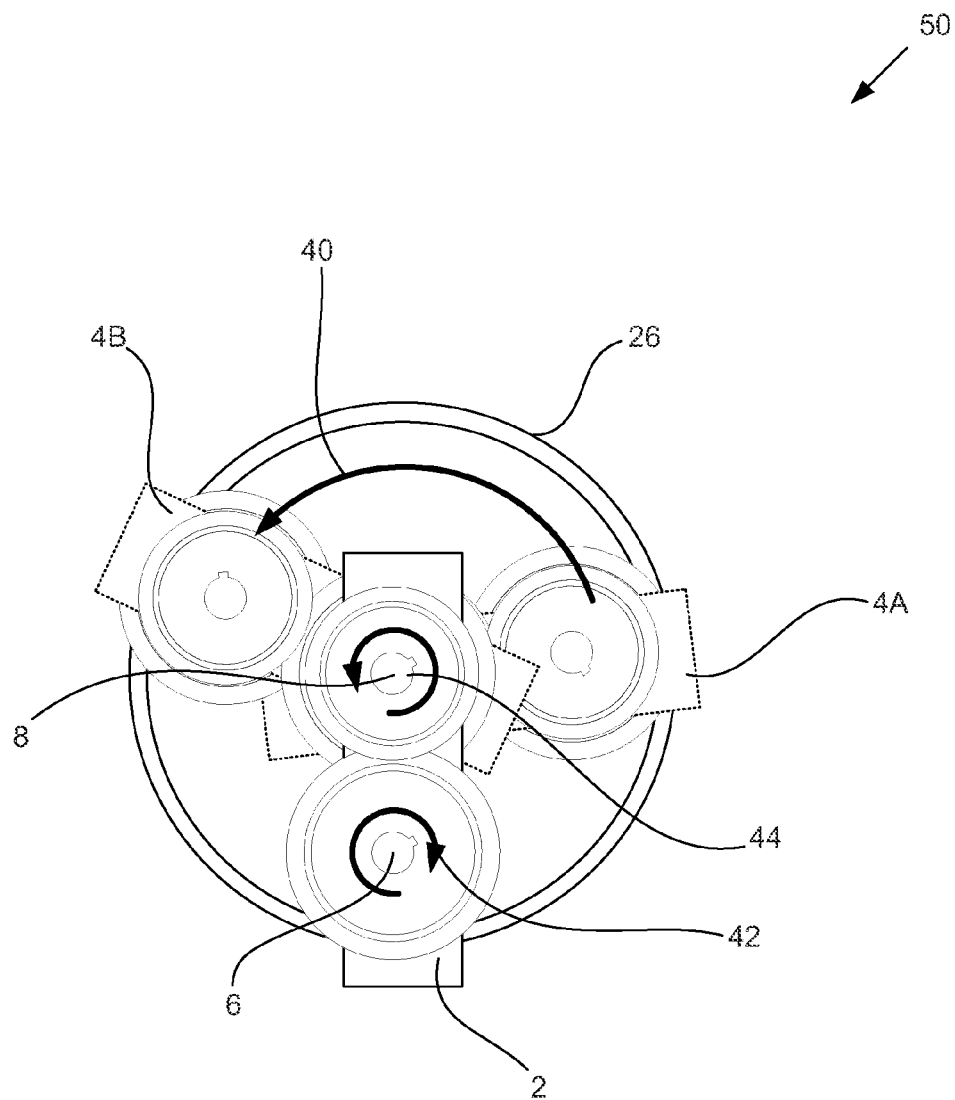
FIG. 4 illustrates motion in an exemplary two-speed gear system in a low-speed alignment position in accordance with one or more embodiments of the automatic multi-speed gear system described herein.

First arm 2 and second arm 4 are configured to move between a high-speed misalignment position (shown in FIGS. 2A-2B) and a low-speed alignment position (shown in FIGS. 3-4).

FIG. 2B illustrates motion in an exemplary two-speed gear system in a high-speed misalignment position in accordance with one or more embodiments of the automatic multi-speed gear system described herein.

When two-speed gear system 50 is in the high-speed misalignment position shown, input axle 6 rotates in input rotational direction 42. In one or more embodiments, input rotational direction 42 is based on the rotational energy provided by the power source.

First axle input gear 16 is rotationally engageable with input axle gear 14 such that the rotational energy of input axle 6 is transferred to first axle 8. First axle 8 rotates in first rotational direction 44 counter to input rotational direction 42.

Second axle input gear 20 is rotationally engageable with first axle output gear 18 such that the rotational energy of first axle 8 is transferred to second axle 10. Second axle 10 rotates in second rotational direction 46 counter to first rotational direction 44.

Output axle gear 24 is rotationally engageable with second axle output gear 22 such that the rotational energy of second axle 10 is transferred to output axle 12. Output axle 12 rotates in output rotational direction 48 counter to second rotational direction 46.

FIG. 3 illustrates an exemplary two-speed gear system in an low-speed alignment position in accordance with one or more embodiments of the automatic multi-speed gear system described herein.

In one or more embodiments, when two-speed gear system 50 is in the low-speed alignment position shown, first arm 2 and second arm 4 are positioned such that first axle axis 34 (not shown) and output axle axis 38 (not shown) are aligned. The alignment of first axle 8 and output axle 12 in this manner allow for the rotation of second axle 10 around the aligned axles (i.e. first axle 8 and output axle 12).

In one or more embodiments, first arm 2 and second arm 4 are configured to move from the high-speed misalignment position to the low-speed alignment position when a generated torque level exceeds a transition torque level. In one or more embodiments, increasing a load on output axle 12 causes a transition from said high-speed misalignment position to said low-speed alignment position such that first axle 8 and output axle 12 are aligned.

In one or more embodiments, first arm 2 and second arm 4 are configured to move from the low-speed alignment position to the high-speed misalignment position when said generated torque level drops below said transition torque level. In one or more embodiments, decreasing a load on output axle 12 causes the transition from the low-speed alignment position to the high-speed misalignment position.

In one or more embodiments, one-way bearing 26 is configured to allow rotation in a direction that causes movement from said high-speed misalignment position to said low-speed alignment position. In one or more embodiments, a momentum of second axle 10 orbiting first axle 8 in the low-speed alignment position facilitates movement from the low-speed alignment position to the high-speed misalignment position.

FIG. 4 illustrates motion in an exemplary two-speed gear system in a low-speed alignment position in accordance with one or more embodiments of the automatic multi-speed gear system described herein.

When two-speed gear system 50 is in the low-speed alignment position shown, input axle 6 rotates in input rotational direction 42. In one or more embodiments, input rotational direction 42 is based on the rotational energy provided by the power source.

First axle input gear 16 is rotationally engageable with input axle gear 14 such that the rotational energy of input axle 6 is transferred to first axle 8. First axle 8 rotates in aligned rotational direction 44 counter to input rotational direction 42.

Second axle 10 is configured to orbit the aligned axles (i.e. first axle 8 and output axle 12) in the low-speed alignment position. In one or more embodiments, second arm 4A-4B moves in orbital motion 40.

In one or more embodiments, the distance from the center of first axle 8 and second axle 10 is substantially equal to the distance from the center of second axle 10 and output axle 12. The orbit is defined by a travel path of second axle input gear 20 around first axle output gear 18, and a travel path of second axle output gear 22 around output axle gear 24. In one or more embodiments, the sum of the radius of second axle input gear 20 and the radius of first axle output gear 18 is substantially equal to the sum of the radius of second axle output gear 22 and the radius of output axle gear 24.

In one or more embodiments, output axle 12 rotates in aligned rotational direction 44.

Figure 5:
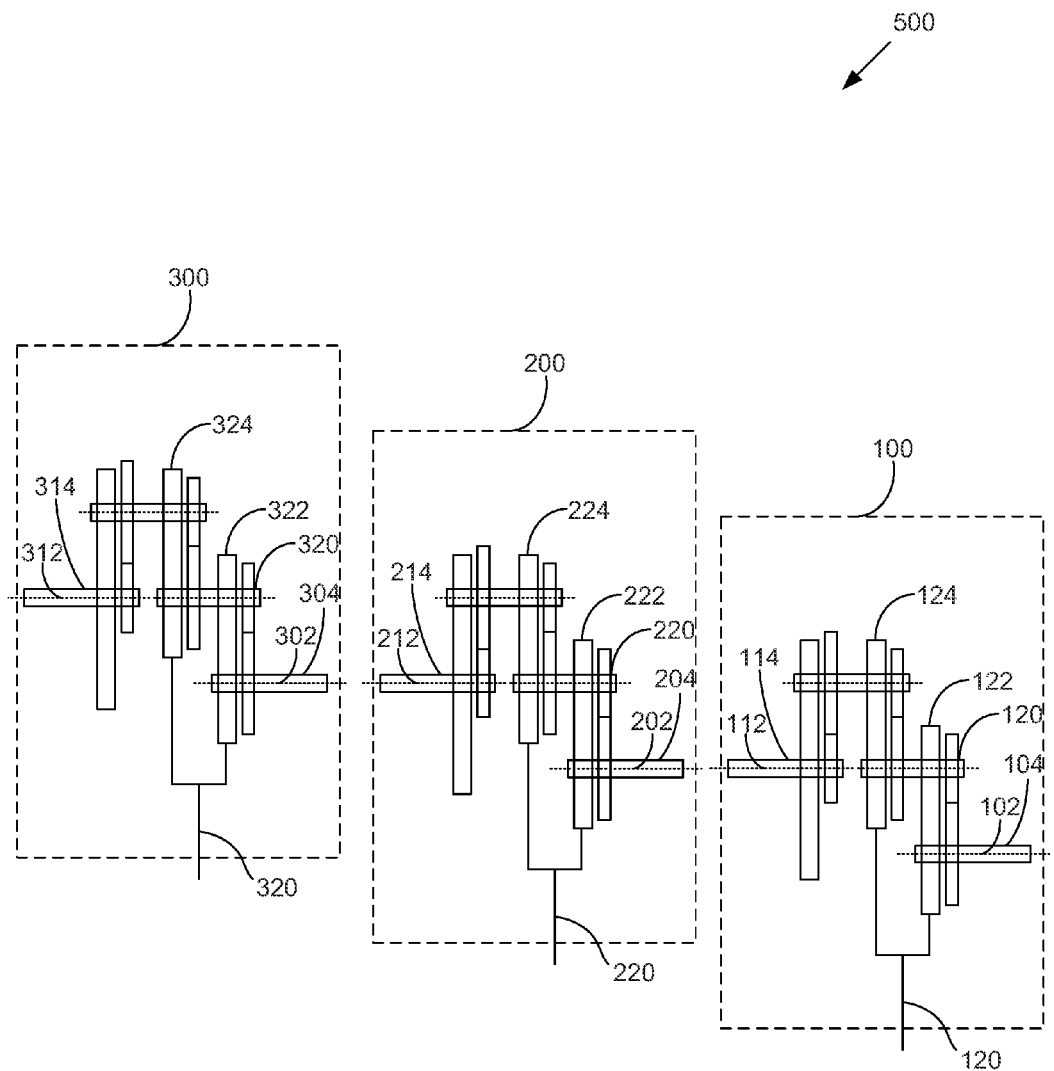
FIG. 5 is a diagram of a side view of an exemplary cascaded multi-speed gear system in accordance with one or more embodiments of the automatic multi-speed gear system described herein.

FIG. 5 is a diagram of a side view of an exemplary cascaded multi-speed gear system in accordance with one or more embodiments of the automatic multi-speed gear system described herein.

Cascaded multi-speed gear system 500 includes two-speed gear system 100, two-speed gear system 200 and two-speed gear system 300. Although three two-speed gear systems are shown in the exemplary embodiment, any number of two-speed gear systems may be cascaded in a multi-speed gear system without departing from the spirit or the scope of the invention.

Two-speed gear system 100 includes input axle 104. Input axle 104 is configured to rotate along input axis 102. Input axle 104 is configured to couple with a power source configured to rotate input axle 104. The power source coupled with input axle 104 may include any manual or automated power source, including power sources powered by an electrical source. In one or more embodiments, the power source coupled with input axle 104 may include one or more turbines, motors, pedals, wheels, or any other mechanism capable of generating and/or accepting energy capable of rotating input axle 104. The power source coupled within input axle 104 may provide a constant or variable rotational energy.

Two-speed gear system 100 includes output axle 114. Output axle 114 is configured to rotate along output axle axis 112.

Two-speed gear system 200 includes input axle 204. Input axle 204 is configured to rotate along input axis 202. Output axle 114 is mechanically coupled with input axle 204 to transfer rotational energy. Output axle 114 may be directly or indirectly coupled with input axle 204. In one or more embodiments, output axle axis 112 and input axle axis 202 are aligned. In one or more embodiments, output axle 114 and input axle 204 are the same axle component.

Two-speed gear system 300 includes input axle 304. Input axle 304 is configured to rotate along input axis 302. Output axle 214 is mechanically coupled with input axle 304 to transfer rotational energy. Output axle 214 may be directly or indirectly coupled with input axle 304. In one or more embodiments, output axle axis 212 and input axle axis 302 are aligned. In one or more embodiments, output axle 214 and input axle 304 are the same axle component.

In one or more embodiments, output axle 314 is mechanically coupled with one or more components configured to power one or more applications where multi-speed functionality is desirable. For example, output axle 314 may be mechanically coupled with one or more drive wheels, drive shafts, rotary devices, or any other application where multi-speed functionality is desirable.

One or more embodiments of the automatic multi-speed gear system are directed to multi-speed gear systems including two or more cascaded two-speed gear systems. For example, a three-speed gear system can be configured by cascading two two-speed gear systems, a four-speed gear system can be configured by cascading three two-speed gear systems, a five-speed gear system can be configured by cascading four two-speed gear systems, etc. For example, each of two-speed gear system 100, 200 and 300 may be configured to move from a high-speed misalignment position to a low-speed alignment position when a generated torque level in each two-speed gear system 100, 200 and 300 exceeds a transition torque level. Likewise, each of two-speed gear system 100, 200 and 300 may be configured to move from a low-speed misalignment position to a high-speed misalignment position when the generated torque level drops below the transition torque level in each of two-speed gear system 100, 200 and 300. The transition torque level may differ of each two-speed gear system 100, 200 and 300 may be the same or different.

One or more embodiments of cascaded multi-speed gear system 500 optionally includes gear system alignment control mechanism 120, gear system alignment control mechanism 220, and gear system alignment control mechanism 320. Gear system alignment control mechanisms 120, 220 and 320 may be any mechanism capable of mechanically moving and controlling an alignment in two-speed gear systems 100, 200 an 300.

Gear system alignment control mechanism 120 is configured to control alignment and misalignment of first arm 122 and second arm 124 in two-speed gear system 100. In one or more embodiments, gear system alignment control mechanism 120 is configured to move at least one of first arm 122 and second arm 124 to align a first axle 120 and output axle 114 along aligned axis 112. In one or more embodiments, gear system alignment control mechanism 120 operates by contacting first at least one of first arm 122 and second arm 124.

Gear system alignment control mechanism 220 is configured to control alignment and misalignment of first arm 222 and second arm 224 in two-speed gear system 200. In one or more embodiments, gear system alignment control mechanism 120 is configured to move at least one of first arm 222 and second arm 224 to align a first axle 220 and output axle 214 along aligned axis 212. In one or more embodiments, gear system alignment control mechanism 220 operates by contacting first at least one of first arm 222 and second arm 224.

Gear system alignment control mechanism 320 is configured to control alignment and misalignment of first arm 322 and second arm 324 in two-speed gear system 300. In one or more embodiments, gear system alignment control mechanism 320 is configured to move at least one of first arm 322 and second arm 324 to align a first axle 320 and output axle 314 along aligned axis 312. In one or more embodiments, gear system alignment control mechanism 320 operates by contacting first at least one of first arm 322 and second arm 324.

One or more embodiments of the automatic multi-speed gear system are directed to multi-speed gear systems including two or more cascaded two-speed gear systems with mechanical control of arm alignment of each two-speed gear system. In one or more embodiments implementing mechanical control of arm alignment for each two-speed gear system, a four-speed gear system can be configured by cascading two two-speed gear systems, an eight-speed gear system can be configured by cascading three two-speed gear systems, a sixteen-speed gear system can be configured by cascading four two-speed gear systems, etc.

While the invention herein disclosed has been described by means of specific embodiments and applications thereof, numerous modifications and variations could be made thereto by those skilled in the art without departing from the scope of the invention set forth in the claims.

What is claimed is:

1. An automatic multi-speed gear system comprising:
   at least one gear system comprising:
   an input axle configured to rotate about an input axle axis;
   an input axle gear coupled with said input axle, wherein said input axle gear is rotatable with said input axle;
   a first arm coupled with said input axle and configured to allow for independent rotational movement of said input axle about said input axle axis, wherein said first arm is configured to rotate about said input axle between a high-speed misalignment position and a low-speed alignment position, wherein said first arm is further coupled with a first axle and configured to allow for independent rotational movement of said first axle about a first axle axis;
   a first axle input gear coupled with said first axle, wherein said first axle input gear is rotatable with said first axle, wherein said first axle input gear is rotationally engageable with said input axle gear;
   a first axle output gear coupled with said first axle, wherein said first axle output gear is rotatable with said first axle;
   a second arm coupled with said first axle and configured to allow for independent rotational movement of said first axle about said first axle axis, wherein said second arm is configured to orbit said first axle in said low-speed alignment position, wherein said second arm is further coupled with a second axle and configured to allow for independent rotational movement of said second axle about a second axle axis;
   a second axle input gear coupled with said second axle, wherein said second axle input gear is rotatable with said second axle, wherein said second axle input gear is rotationally engageable with said first axle output gear;
   a second axle output gear coupled with said second axle, wherein said second axle output gear is rotatable with said second axle; and
   an output axle gear coupled with and rotatable with an output axle and configured to rotationally engage with said second axle output gear.

2. The automatic multi-speed gear system of claim 1, further comprising:
   a one-way bearing coupled with said second axle and said output axle.

3. The automatic multi-speed gear system of claim 1, wherein said input axle is couplable to an external power source.

4. The automatic multi-speed gear system of claim 1, wherein said output axle is couplable to an external load.

5. The automatic multi-speed gear system of claim 4, wherein increasing magnitude of said load beyond a certain level causes said first arm to rotate from said high-speed misalignment position to said low-speed alignment position.

6. The automatic multi-speed gear system of claim 5, wherein said second axle input gear orbits said first axle output gear and said second axle output gear orbits said output axle gear in said low-speed alignment position.

7. The automatic multi-speed gear system of claim 1, wherein said at least one gear system comprises a first gear system and a second gear system, wherein said first gear system and said second gear system are cascaded such that input axle of said second gear system is coupled to output axle of said first gear system.

8. An automatic multi-speed gear system comprising:
   at least one gear system comprising:
   an input axle configured to rotate about an input axle axis;
   an input axle gear coupled with said input axle, wherein said input axle gear is rotatable with said input axle;
   a first arm coupled through a first bearing with said input axle, wherein said first arm is configured to rotate about said input axle between a high-speed misalignment position and a low-speed alignment position, wherein said first arm is further coupled through a second bearing with a first axle;
   a first axle input gear coupled with said first axle, wherein said first axle input gear is rotatable with said first axle, wherein said first axle input gear is rotationally engageable with said input axle gear;
   a first axle output gear coupled with said first axle, wherein said first axle output gear is rotatable with said first axle;
   a second arm coupled through a third bearing with said first axle, wherein said second arm is configured to orbit said first axle in said low-speed alignment position, wherein said second arm is further coupled through a fourth bearing with a second axle;
   a second axle input gear coupled with said second axle, wherein said second axle input gear is rotatable with said second axle, wherein said second axle input gear is rotationally engageable with said first axle output gear;
   a second axle output gear coupled with said second axle, wherein said second axle output gear is rotatable with said second axle; and
   an output axle gear coupled with and rotatable with an output axle and configured to rotationally engage with said second axle output gear.

9. The automatic multi-speed gear system of claim 8, further comprising:
   a one-way bearing coupled with said second axle and said output axle.

10. The automatic multi-speed gear system of claim 8, wherein said input axle is couplable to an external power source.

11. The automatic multi-speed gear system of claim 8, wherein said output axle is couplable to an external load.

12. The automatic multi-speed gear system of claim 11, wherein increasing magnitude of said load beyond a certain level causes said first arm to rotate from said high-speed misalignment position to said low-speed alignment position.

13. The automatic multi-speed gear system of claim 12, wherein said second axle input gear orbits said first axle output gear and said second axle output gear orbits said output axle gear in said low-speed alignment position.

14. The automatic multi-speed gear system of claim 8, wherein said at least one gear system comprises a first gear system and a second gear system, wherein said first gear system and said second gear system are cascaded such that input axle of said second gear system is coupled to output axle of said first gear system.

15. An automatic multi-speed gear system comprising:
    at least one gear system comprising:
        an input axle configured to rotate about an input axle axis;
        an input axle gear coupled with said input axle;
        a first arm coupled through a first bearing with said input axle, wherein said first arm is configured to rotate about said input axle between a high-speed misalignment position and a low-speed alignment position, wherein said first arm is further coupled through a second bearing with a first axle;
        a first axle input gear coupled with said first axle, wherein said first axle input gear is rotationally engageable with said input axle gear;
        a first axle output gear coupled with said first axle;
        a second arm coupled through a third bearing with said first axle, wherein said second arm is configured to orbit said first axle in said low-speed alignment position, wherein said second arm is further coupled through a fourth bearing with a second axle;
        a second axle input gear coupled with said second axle, wherein said second axle input gear is rotationally engageable with said first axle output gear;
        a second axle output gear coupled with said second axle;
        an output axle gear coupled with an output axle and configured to rotationally engage with said second axle output gear; and
        a one-way bearing coupled with said second axle and said output axle.

16. The automatic multi-speed gear system of claim 15, wherein said input axle is couplable to an external power source.

17. The automatic multi-speed gear system of claim 15, wherein said output axle is couplable to an external load.

18. The automatic multi-speed gear system of claim 17, wherein increasing magnitude of said load beyond a certain level causes said first arm to rotate from said high-speed misalignment position to said low-speed alignment position.

19. The automatic multi-speed gear system of claim 18, wherein said second axle input gear orbits said first axle output gear and said second axle output gear orbits said output axle gear in said low-speed alignment position.

20. The automatic multi-speed gear system of claim 15, wherein said at least one gear system comprises a first gear system and a second gear system, wherein said first gear system and said second gear system are cascaded such that input axle of said second gear system is coupled to output axle of said first gear system.

* * * * *